Feb. 26, 1957  W. S. KLECZEK  2,783,020
HIGH-PRESSURE, HIGH CAPACITY PNEUMATIC VALVE
Filed Oct. 14, 1953
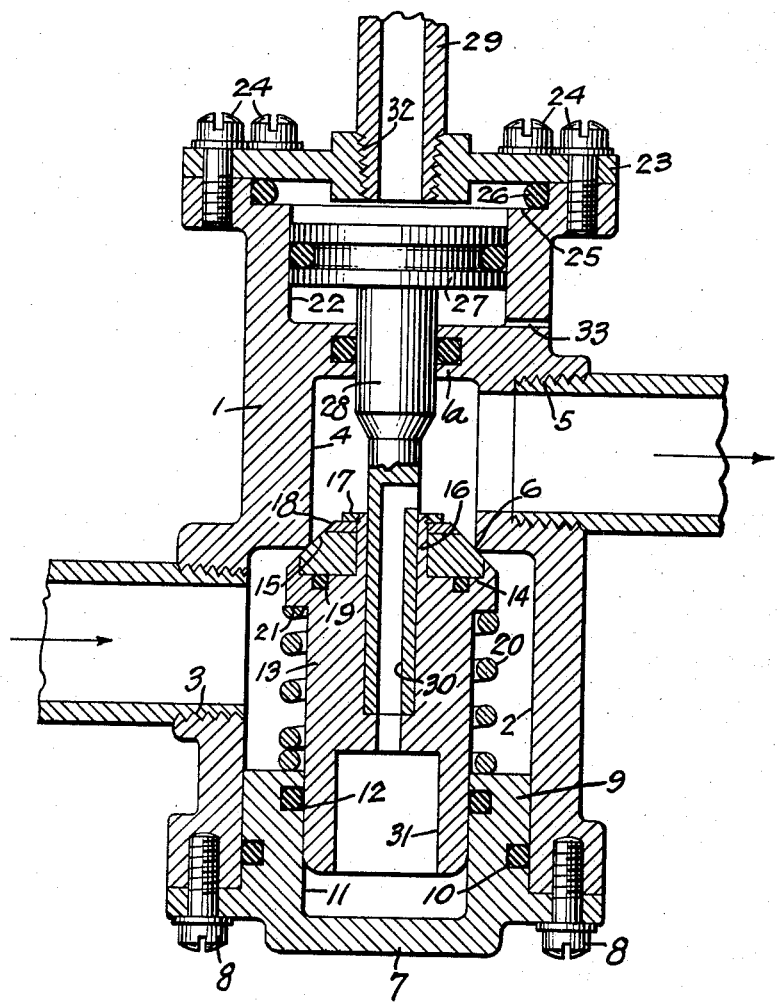
INVENTOR.
Walter S. Kleczek
BY
*W. E. Thibodeau + A. W. Dew*
ATTORNEYS

United States Patent Office 2,783,020
Patented Feb. 26, 1957

2,783,020

HIGH-PRESSURE, HIGH CAPACITY PNEUMATIC VALVE

Walter S. Kleczek, Schenectady, N. Y., assignor, by mesne assignments, to the United States of America as represented by the Secretary of the Army Application October 14, 1953, Serial No. 386,142

2 Claims. (Cl. 251—62)

This invention relates to a high-pressure high capacity pneumatic valve. Due to the high flow rates of propellent fluids in rocketry and related arts, a serious problem is encountered in valving such fluids because of the excessive pressure drop or difference between the upstream and downstream sides of the valve. Such pressure drop not only represents a loss of pressure head otherwise usable at the nozzles, but requires an unnecessarily large actuating or controlling force in those instances where the valve is controlled by separate source of pneumatic or hydraulic pressure.

It is therefore the principal object of my invention to provide a valve capable of handling high pressure fluids at high flow rates with minimum pressure drop.

It is a further object to provide a valve of the type aforesaid which when open, can be controlled by a minimum control force and which, as a result, is capable of very rapid operation in opening and closing.

A still further object is to provide a valve which, when open, is substantially balanced so that it is controlled only by the actuating or control pressure and the control spring.

A still further object is to provide a valve of the type described which is relatively simple and inexpensive to construct, and rugged, reliable and longlived in operation, being capable of cycling many thousands of times without deterioration or failure.

The single figure of the drawing is an axial cross section through a preferred form of the invention.

Referring in detail to the drawing 1 identifies a valve body having an upstream chamber 2 with inlet port 3 and a downstream chamber 4 with outlet port 5. A valve seat 6 is formed by the shoulder between the chambers 2 and 4 of greater and lesser diameters, respectively.

The high pressure end of body 1 is closed by an end cap 7 secured thereover by cap screws 8. This cap has an extension 9 fitting within the chamber 2 and provided with a channel 10 for a sealing ring and an axial bore 11.

A second sealing ring channel 12 is provided in extension 9 to open into bore 11 in sealing relation with valve plunger 13 which is of generally cylindrical form to have a smooth sliding fit at one end within bore 11. The other end of the plunger is provided with a seat 14 for receiving frusto-conical valve face 15, which is held to its seat by any suitable construction such as an integral extension 16 of the plunger, a nut 17 threaded thereon and an interposed washer 18. A sealing ring channel 19 is provided in the plunger opening through the face of seat 14 to prevent fluid leakage about the valve stem. A spring 20 surrounds the plunger and acts between a shoulder 21 on the plunger and the interior face of extension 9, to urge the plunger into closed position.

The valve body or casing 1 at its end adjacent the downstream chamber, is formed to define a cylinder or control pressure chamber 22 closed by an end plate 23 which is secured to the body by cap screws 24. Sealing in this instance is effected by a counterbore 25 in the end of the body to form a shoulder receiving a sealing ring 26 clamped in position by plate 23. A control piston 27 operates within chamber 22 and is provided with a rod 28 extending through an opening in partition 1a of body 1 and connected at its other end with valve plunger 13. As shown the rod 28 has a first portion of relatively large diameter connected with piston 27, and a second reduced portion connected with valve plunger 13 so that when control pressure is admitted to chamber 22 through connection 29 and port 32 above piston 27, the valve is opened. Stem 28 is provided with an equalizing passage 30 which places the downstream chamber 4 in communication with bore 11, which, as shown, is of the same diameter or cross-sectional area as the downstream chamber 4. A counterbore 31 in the end of plunger 13 assures that the pressure in chamber 4 will be at all times effective upon the lower face of the plunger. A vent 33 equalizes pressure below piston 27 with atmospheric.

In normal operation of the valve an upstream pressure which may be up to 3000 p. s. i. is connected with inlet port 3. Actuating or control pressure of the order of 150 to 650 p. s. i. is connected with port 32 under control of a small three-way solenoid valve (not shown). When the solenoid valve is energized, control pressure acts upon piston 27, forces the valve open against the action of spring 20 and allows high-pressure fluid to flow to outlet port 5. At the same time, the pressure in chamber 4 becomes effective upon the lower portion of the plunger through passageway 30, thus substantially canceling the effect of the high pressure incident upon the valve face. The valve is then under the control only of the actuating pressure from connection 29 in one direction, and the force of spring 20 in the other direction. When control pressure is removed, as by de-energization of the solenoid control valve, the spring forces the valve assembly and piston to closed position, thereby stopping the flow of fluid.

I have therefore provided a high-capacity, high-pressure valve which is relatively simple to construct and assemble and which is capable of handling high flow rates with small pressure drop, rapid actuation and long life based on total number of cycles or operations.

While I have shown the preferred form of the invention as now known to me, various modifications, refinements and substitutions will occur to those skilled in the art after a study of the foregoing disclosure. Consequently I desire the foregoing to be taken in an illustrative, rather than a limiting sense. It is my desire and intention to reserve all modifications within the scope of the subjoined claims.

Having now fully disclosed the invention, what I claim and desire to secure by Letters Patent is:

1. In a high-pressure, high-capacity valve, a valve body having a bore from one end only thereof and defining a first chamber, and a counterbore from said one end defining a second chamber, said bore and counterbore defining between them a shoulder forming a valve seat, a cap secured in gas-tight relation to said body over said counterbore and closing the same, said cap having a bored extension extending into said counterbore, a plunger slidably fitting the bore in said extension and having a face adapted to rest on said seat, a coil spring surrounding said plunger and acting between said extension and an abutment on said plunger to urge said face onto its seat, means fixed with the end of said body remote from said cap and defining a pressure control cylinder coaxial of said first chamber, a piston fitting said control cylinder, a rod connecting said piston and plunger, there being a bore in the end of said plunger facing said cap, there also being an equalizing passage in said rod and plunger connecting the bore therein with said first chamber, outlet and inlet pressure connections in said body with said first and second chambers respectively and a pressure control connection with said pressure control cylinder on the side of the piston therein remote from said plunger.

2. A high-pressure, high-capacity valve comprising, a valve body having aligned first and second bores from opposite ends thereof defining a partition between them, said first bore being counterbored to define therewith, respective first and second chambers, defining a valve seat shoulder between them, a first cap secured to said body over said counterbore in pressure-tight relation and having a bored extension extending into said counterbore, a plunger slidably fitting the bore in said extension and having a face adapted to rest on said seat, a coil spring encircling said plunger and acting between an abutment thereon and said extension to urge said face onto its seat, a piston slidably fitting said second bore, a second cap secured over said second bore in pressure-tight relation, a rod connecting said piston and plunger through a sealed opening in said partition, there being a passageway in said rod placing said first chamber in communication with the space between said plunger and first cap, a fluid entrance connection in said body to said second chamber, a fluid exit connection in said body from said first chamber, and a pressure control connection through said second cap.

References Cited in the file of this patent

UNITED STATES PATENTS

| | | |
|---|---|---|
| 404,504 | Ross | June 4, 1889 |
| 560,550 | Smith | May 19, 1896 |
| 725,893 | Truman | Apr. 21, 1903 |
| 1,385,019 | Mathieu | July 19, 1921 |
| 1,525,426 | Mueller | Feb. 3, 1925 |
| 2,628,635 | Stevenson | Feb. 17, 1953 |
| 2,642,088 | Kirkham | June 16, 1953 |